(12) United States Patent
Gravell et al.

(10) Patent No.: US 7,203,666 B1
(45) Date of Patent: Apr. 10, 2007

(54) VIRTUAL POSTAGE METERING SYSTEM

(75) Inventors: Linda V Gravell, Sutton, MA (US);
Jeffrey D Pierce, Norwalk, CT (US);
Leon A. Pintsov, West Hartford, CT (US); John G. Rahrig, Stratford, CT (US); David W. Riley, Easton, CT (US)

(73) Assignee: Pitney Bowes Inc., Stamford, CT (US)

( * ) Notice: Subject to any disclaimer, the term of this patent is extended or adjusted under 35 U.S.C. 154(b) by 557 days.

(21) Appl. No.: 09/242,210

(22) PCT Filed: Jun. 12, 1998

(86) PCT No.: PCT/US98/12081

§ 371 (c)(1),
(2), (4) Date: Nov. 4, 1999

(87) PCT Pub. No.: WO98/57302

PCT Pub. Date: Dec. 17, 1998

Related U.S. Application Data

(60) Provisional application No. 60/049,518, filed on Jun. 13, 1997.

(51) Int. Cl.
*G06F 17/00* (2006.01)
*G07F 19/00* (2006.01)

(52) U.S. Cl. .................. 705/401; 705/404; 705/408; 705/409; 705/60; 705/70; 705/71; 380/51

(58) Field of Classification Search ............... 705/401, 705/404, 408, 409, 60, 71, 70; 380/51
See application file for complete search history.

(56) References Cited

U.S. PATENT DOCUMENTS 4,180,856 A 12/1979 Check, Jr. et al. .......... 705/407

(Continued)

FOREIGN PATENT DOCUMENTS

EP 0833285 4/1998

(Continued)

OTHER PUBLICATIONS

Information Based Indicia Program (IBIP) Open System Indicium Specification (Prepared for: The United States Postal Service, July 23, 1997).*

(Continued)

*Primary Examiner*—Andrew J. Fischer
*Assistant Examiner*—Cristina Owen Sherr
(74) *Attorney, Agent, or Firm*—Brian A. Lemm; Angelo N. Chaclas

(57) ABSTRACT

A virtual postage metering system and method provides value added services corresponding to postage metering transactions. Funds are not stored at a user's site, reducing the risk of unauthorized modification of accounting balances. There is a database record of every mailpiece, thereby improving verification since all valid pieces are known. Furthermore, the present invention enables the Post to know the volume of mail to be processed prior to receipt of physical mail pieces. Since more mailer data is available (e.g. when users usually mail, how much mail per day, average postage amount) the virtual postage metering system enables the postal service to predict mail handling patterns. Additionally, users have the option to pay as they go which contrasts present systems in which funds must be on deposit prior to being downloaded to a meter although such downloaded funds may remain in the meter for weeks before being used.

10 Claims, 7 Drawing Sheets

U.S. PATENT DOCUMENTS

| | | | |
|---|---|---|---|
| 4,376,299 A | 3/1983 | Rivest | |
| 4,376,981 A | 3/1983 | Check, Jr. et al. | 705/401 |
| 4,423,287 A | 12/1983 | Zeidler | |
| 4,556,944 A | 12/1985 | Daniels et al. | 705/407 |
| 4,567,359 A | 1/1986 | Lockwood | |
| 4,578,530 A | 3/1986 | Zeidler | |
| 4,725,718 A * | 2/1988 | Sansone et al. | 235/495 |
| 4,757,537 A | 7/1988 | Edelmann et al. | 380/51 |
| 4,775,246 A * | 10/1988 | Edelmann et al. | 705/62 |
| 4,802,218 A * | 1/1989 | Wright et al. | 705/60 |
| 4,812,994 A | 3/1989 | Taylor et al. | |
| 4,831,555 A * | 5/1989 | Sansone et al. | 705/408 X |
| 4,873,645 A | 10/1989 | Hunter et al. | 705/403 X |
| 4,873,646 A | 10/1989 | Stoops | |
| 4,936,209 A | 6/1990 | Diel | 101/93.01 |
| 5,128,988 A | 7/1992 | Cowell et al. | 379/106.03 |
| 5,146,403 A | 9/1992 | Goodman | 707/102 |
| 5,163,098 A | 11/1992 | Dahbura | |
| 5,191,533 A | 3/1993 | Haug | |
| 5,233,657 A | 8/1993 | Gunther | |
| 5,239,168 A | 8/1993 | Durst, Jr. et al. | 235/432 |
| 5,257,196 A | 10/1993 | Sansone | |
| 5,319,562 A | 6/1994 | Whitehouse | 705/403 |
| 5,410,598 A | 4/1995 | Shear | |
| 5,454,038 A | 9/1995 | Cordery et al. | 705/60 |
| 5,491,796 A | 2/1996 | Wanderer et al. | |
| 5,510,992 A | 4/1996 | Kara | 705/408 |
| 5,526,428 A | 6/1996 | Arnold | |
| 5,590,198 A | 12/1996 | Lee et al. | |
| 5,602,742 A | 2/1997 | Solondz et al. | |
| 5,625,694 A | 4/1997 | Lee et al. | |
| 5,675,650 A | 10/1997 | Cordery et al. | |
| 5,680,463 A | 10/1997 | Windel et al. | |
| 5,682,429 A | 10/1997 | Cordery et al. | |
| 5,699,258 A | 12/1997 | Thiel | |
| 5,781,438 A | 7/1998 | Lee et al. | |
| 5,781,634 A | 7/1998 | Cordery et al. | |
| 5,796,841 A | 8/1998 | Cordery et al. | |
| 5,812,401 A | 9/1998 | Moore | |
| 5,812,666 A | 9/1998 | Baker et al. | |
| 5,812,991 A | 9/1998 | Kara | 705/410 |
| 5,822,739 A * | 10/1998 | Kara | 705/410 |
| 5,826,247 A | 10/1998 | Pintsov et al. | |
| 5,943,658 A | 8/1999 | Gravell et al. | |
| 6,005,945 A * | 12/1999 | Whitehouse | 380/51 |
| 6,061,670 A | 5/2000 | Brand | |
| 6,085,181 A | 7/2000 | Gravell et al. | |
| 6,249,777 B1 | 6/2001 | Kara et al. | |
| 6,295,359 B1 | 9/2001 | Cordery et al. | |

FOREIGN PATENT DOCUMENTS

| | | | |
|---|---|---|---|
| EP | 833285 A2 * | 4/1998 | |
| JP | 06-284124 A | 7/1994 | |

OTHER PUBLICATIONS

Information Based Indicia Program (IBIP) Open System Indicium Specification (Prepared for: The United States Postal Service, July 23, 1997).*

Gash, Andy; "What was lick and stick has now become click," ABIX—Australasian Business Intelligence, Apr. 14, 1998, p. 20 (Abstract Only).

"Information Based Indicia Program (IBIP) Indicium Specification," United States Postal Service, Draft dated Jul. 23, 1997.

"Information Based Indicia Program (IBIP) Postal Security Device Specification," United States Postal Service, Draft dated Jul. 23, 1997.

"Information Based Indicia Program (IBIP) Host System Specification," United States Postal Service, Draft dated Oct. 9, 1996.

"Information Based Indicia Program (IBIP) Key Management Plan," United States Postal Service, Draft dated Apr. 25, 1997.

Specification of U.S. Appl. No. 09/242,208, titled "System and Method for Controlling a Postage Metering Using Data Required for Printing," filed Jun. 12, 1998.

Specification of U.S. Appl. No. 09/242,209, titled "System and Method for Dynamic Selection of Appropriate Postal Rates Based on Metering Data," filed Jun. 12, 1998.

Specification of U.S. Appl. No. 09/242,206, titled "Virtual Postage Meter With Mulitple Origins of Deposit," filed Jun. 12, 1998.

Specification of U.S. Appl. No. 09/242,205, titled "Method for Access Control in s Virtual Postage Metering System," filed Jun. 12, 1998.

Specification of U.S. Appl. No. 09/242,207, titled "Virtual Postage Meter With Secure Digital Signature Device," filed Jun. 12, 1998.

* cited by examiner

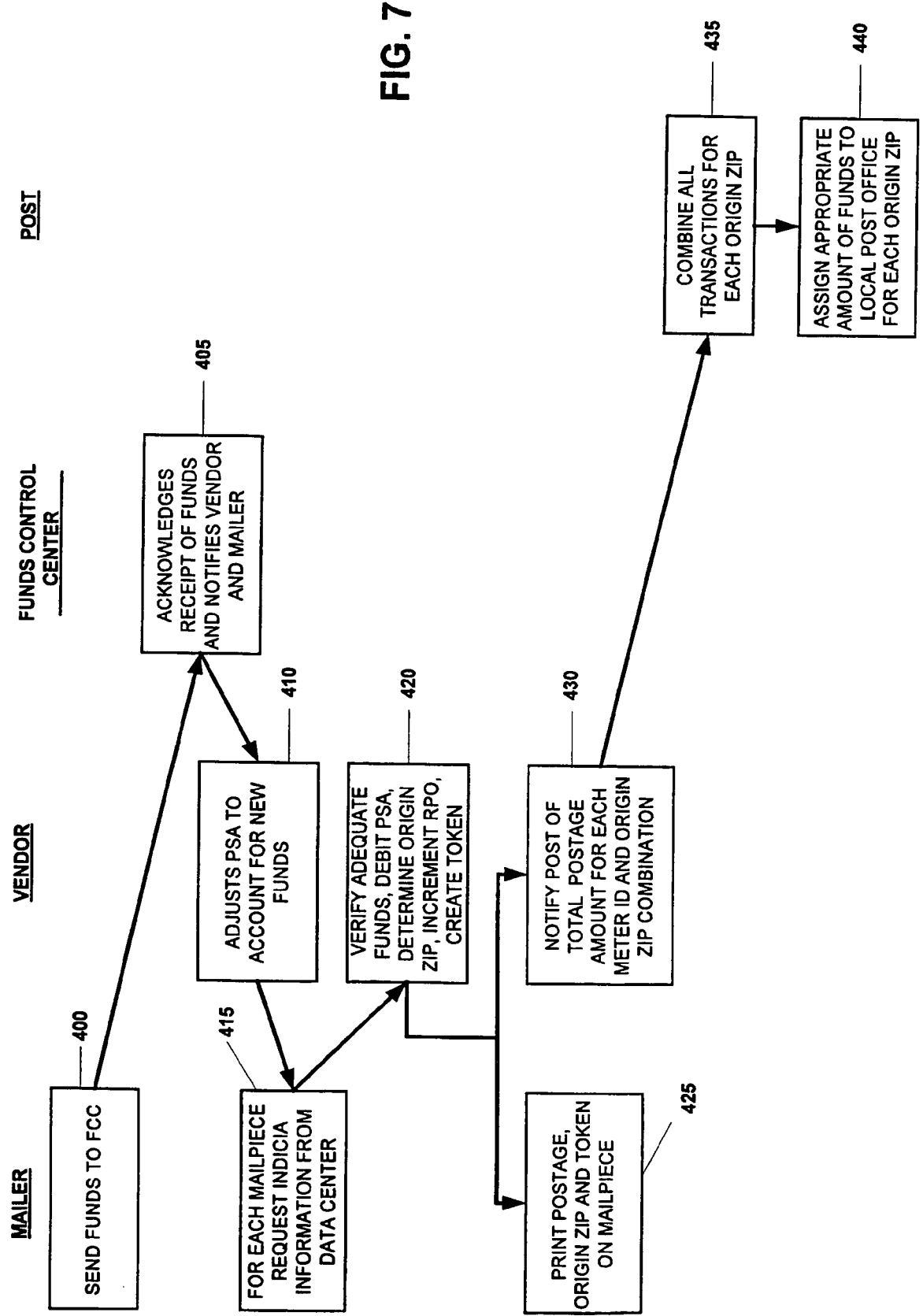

VIRTUAL POSTAGE METERING SYSTEM

This is a continuation-in-part application of U.S. Provisional Patent Application Ser. No. 60/049,518, filed Jun. 13, 1997, now abandoned, and assigned to the assignee of the present invention.

FIELD OF THE INVENTION

The present invention relates generally to a postage metering system and method for evidencing postage payment in an open system and, more particularly, to a postage metering system and method for evidencing postage payment in a virtual postage metering system configuration.

RELATED APPLICATIONS

The present application is related to the following U.S. patent application Ser. Nos. 09/242,208; 09/242,209; 09/242,206; 09/242,205 and 09/242,207, all being assigned to the assignee of the present invention, all of which are incorporated herein by reference in their entirety.

BACKGROUND OF THE INVENTION

Postage metering systems have been developed which employ encrypted information that is printed on a mailpiece as part of an indicium evidencing postage payment. The encrypted information includes a postage value for the mailpiece combined with other postal data that relate to the mailpiece and the postage meter printing the indicium. The encrypted information, typically referred to as a digital token or a digital signature, authenticates and protects the integrity of information, including the postage value, imprinted on the mailpiece for later verification of postage payment. Since the digital token incorporates encrypted information relating to the evidencing of postage payment, altering the printed information in an indicium is detectable by standard verification procedures. Examples of systems that generate and print such indicium are described in U.S. Pat. Nos. 4,725,718, 4,757,537, 4,775,246 and 4,873,645, each assigned to the assignee of the present invention.

Presently, there are two postage metering device types: a closed system and an open system. In a closed system, the system functionality is solely dedicated to metering activity. Examples of closed system metering devices, also referred to as postage evidencing devices, include conventional digital and analog (mechanical and electronic) postage meters wherein a dedicated printer is securely coupled to a metering or accounting function. In a closed system, typically the printer is securely coupled and dedicated to the meter, and printing evidence of postage cannot take place without accounting for the evidence of postage. In an open system, the printer is not dedicated to the metering activity, freeing system functionality for multiple and diverse uses in addition to the metering activity. Examples of open system metering devices include personal computer (PC) based devices with single/multi-tasking operating systems, multi-user applications and digital printers. An open system metering device is a postage evidencing device with a non-dedicated printer that is not securely coupled to a secure accounting module. An open system indicium printed by the non-dedicated printer is made secure by including addressee information in the encrypted evidence of postage printed on the mailpiece for subsequent verification. See U.S. Pat. Nos. 4,725,718 and 4,831,555, each assigned to the assignee of the present invention.

The United States Postal Service ("USPS") has proposed an Information-Based Indicia Program ("IBIP"), which is a distributed trusted system to retrofit and augment existing postage meters using new evidence of postage payment known as information-based indicia. The program relies on digital signature techniques to produce for each envelope an indicium whose origin can be authenticated and content cannot be modified. IBIP is expected to support new methods of applying postage in addition to the current approach, which typically relies on a postage meter to print indicia on mailpieces. IBIP requires printing a large, high density, two-dimensional ("2-D") bar code on a mailpiece. The 2-D bar code encodes information and is signed with a digital signature.

The USPS has published draft specifications for IBIP. The INFORMATION BASED INDICIA PROGRAM (IBIP) INDICIUM SPECIFICATION, dated Jun. 13, 1996, and revised Jul. 23, 1997, ("IBIP Indicium Specification") defines the proposed requirements for a new indicium that will be applied to mail being created using IBIP. The INFORMATION BASED INDICIA PROGRAM POSTAL SECURITY DEVICE SPECIFICATION, dated Jun. 13, 1996, and revised Jul. 23, 1997, ("IBIP PSD Specification") defines the proposed requirements for a Postal Security Device ("PSD"), which is a secure processor-based accounting device that dispenses and accounts for postal value stored therein to support the creation of a new "information based" postage postmark or indicium that will be applied to mail being processed using IBIP. The INFORMATION BASED INDICIA PROGRAM HOST SYSTEM SPECIFICATION, dated Oct. 9, 1996, defines the proposed requirements for a host system element of IBIP ("IBIP Host Specification"). IBIP includes interfacing user, postal and vendor infrastructures which are the system elements of the program. The INFORMATION BASED INDICIA PROGRAM KEY MANAGEMENT PLAN SPECIFICATION, dated Apr. 25, 1997, defines the generation, distribution, use and replacement of the cryptographic keys used by the USPS product/service provider and PSDs ("IBIP KMS Specification"). The specifications are collectively referred to herein as the "IBIP Specifications".

The IBIP Specifications define a stand-alone open metering system, referred to herein as a PC Meter comprising a PSD coupled to a personal computer ("PC") which operates as a host system with a printer coupled thereto ("Host PC"). The Host PC runs the metering application software and associated libraries (collectively referred to herein as "Host Applications") and communicates with one or more attached PSDs. The PC Meter can only access PSDs coupled to the Host PC. There is no remote PSD access for the PC Meter.

The PC Meter processes transactions for dispensing postage, registration and refill on the Host PC. Processing is performed locally between the Host PC and the PSD coupled thereto. Connections to a Data Center, for example for registration and refill transactions, are made locally from the Host PC through a local or network modem/internet connection. Accounting for debits and credits to the PSD is also performed locally, logging the transactions on the Host PC. The Host PC may accommodate more than one PSD, for example supporting one PSD per serial port. Several application programs running on the Host PC, such as a word processor or an envelope designer, may access the Host Applications.

The IBIP Specifications do not address an IBIP open metering system on a network environment. However, the specifications do not prohibit such a network-based system. Generally, in a network environment a network Server controls remote printing requested by a Client PC on the network. Of course, the Client PC controls any local printing.

One version of a network metering system, referred to herein as a "virtual postage metering system", has many Host PCs without any PSDs coupled thereto. The Host PCs run Host Applications, but all PSD functions are performed on Server(s) located at a Data Center. The PSD functions at the Data Center may be performed in a secure device attached to a computer at the Data Center, or may be performed in the Data Center computer itself. The Host PCs must connect with the Data Center to process transactions such as postage dispensing, meter registration, or meter refills. Transactions are requested by the Host PC and sent to the Data Center for remote processing. The transactions are processed centrally at the Data Center and the results are returned to the Host PC. Accounting for funds and transaction processing are centralized at the Data Center. See, for example, U.S. Pat. Nos. 5,454,038 and 4,873,645, which are assigned to the assignee of the present invention.

The virtual postage metering system does not conform to all the current requirements of the IBIP Specifications. In particular, the IBIP Specifications do not permit PSD functions to be performed at the Data Center. However, it is understood that a virtual postage metering system configuration with each mailer's PSD located at the Data Center may provide an equivalent level of security as required by the IBIP Specifications.

In conventional closed system mechanical and electronic postage meters a secure link is required between printing and accounting functions. For postage meters configured with printing and accounting functions performed in a single, secure box, the integrity of the secure box is monitored by periodic inspections of the meters. More recently, digital printing postage meters typically include a digital printer coupled to a metering (accounting) device, which is referred to herein as a postal security device (PSD). Digital printing postage meters have removed the need for physical inspection by cryptographically securing the link between the accounting and printing mechanisms. In essence, new digital printing postage meters create a secure point to point communication link between the PSD and print head. See, for example, U.S. Pat. No. 4,802,218, issued to Christopher B. Wright et al. and now assigned to the assignee of the present invention. An example of a digital printing postage meter with secure print head communication is the Personal Post Office™ manufactured by Pitney Bowes Inc. of Stamford, Conn.

In U.S. Pat. Nos. 4,873,645 and 5,454,038, a virtual postage metering system and method are disclosed wherein the postal accounting and token generation occur at a data center remote from the postage evidencing printer. Although the Data Center may be a secure facility, there remain certain inherent security issues since the accounting and token generation functions do not occur in a secure device local to the postage printer. The virtual postage metering system includes a computer coupled to an unsecured printer and to a remote data metering system. The postal accounting and the token generation occur at the Data Center.

The Data Center is a centralized facility under the control of a meter vendor, such as Pitney Bowes, or the Postal Service. As such, it is regarded as secure compared to the environment that mailers handle meters directly. However, data stored at the Data Center is accessible to Data Center personnel and, therefore, at a minimum, subject to at least inadvertent modification by such personnel. Any unauthorized changes to the user and meter data stored at the Data Center compromises the integrity of the virtual postage metering system.

SUMMARY OF THE INVENTION

It has been determined that a virtual postage metering system provides benefits that are not available under conventional postage payment systems. For the Posts, a virtual postage metering system provides central management of all postage without the need to manage physical meters or PSDs. A further benefit is the opportunity to directly associate a mailer to each mailpiece as opposed to each reset. For mailers, no metering hardware, i.e. postage meter or PSD, is needed. Nor do mailers need to maintain current lists of valid addresses, such as with purchased CD-ROMs. Mailers can acquire postage on an as-needed basis. Finally, meter vendors do not have to keep track of physical meters. A virtual postage metering system eliminates stolen or relocated meter problems and simplifies meter management in general.

The virtual postage metering system is configured with a local PC obtaining postage value from a PSD that is remotely located at the Data Center. The PC includes a modem or internet connection for accessing the Data Center.

In accordance with the present invention, a virtual postage metering system and method provides value added services corresponding to postage metering transactions. Funds are not are stored at a user's site reducing the risk of unauthorized modification of accounting balances. There is a database record of every mailpiece, which means that verification will be improved since all valid pieces are known. Furthermore, the present invention enables the Post to know the volume of mail to be processed prior to receipt of physical mail pieces. Since more mailer data is available (e.g. when users usually mail, how much mail per day, average postage amount) the virtual postage metering system enables the postal service to predict mail handling patterns. Finally, users have the option to pay as they go which contrasts present systems in which funds must be on deposit prior to being downloaded to a meter although such downloaded funds may remain in the meter for weeks before being used.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which:

FIG. 7 is a flow chart of a prepayment method for accounting and distributing funds to multiple origins of deposit.

DETAILED DESCRIPTION OF THE PRESENT INVENTION

Figure 1:
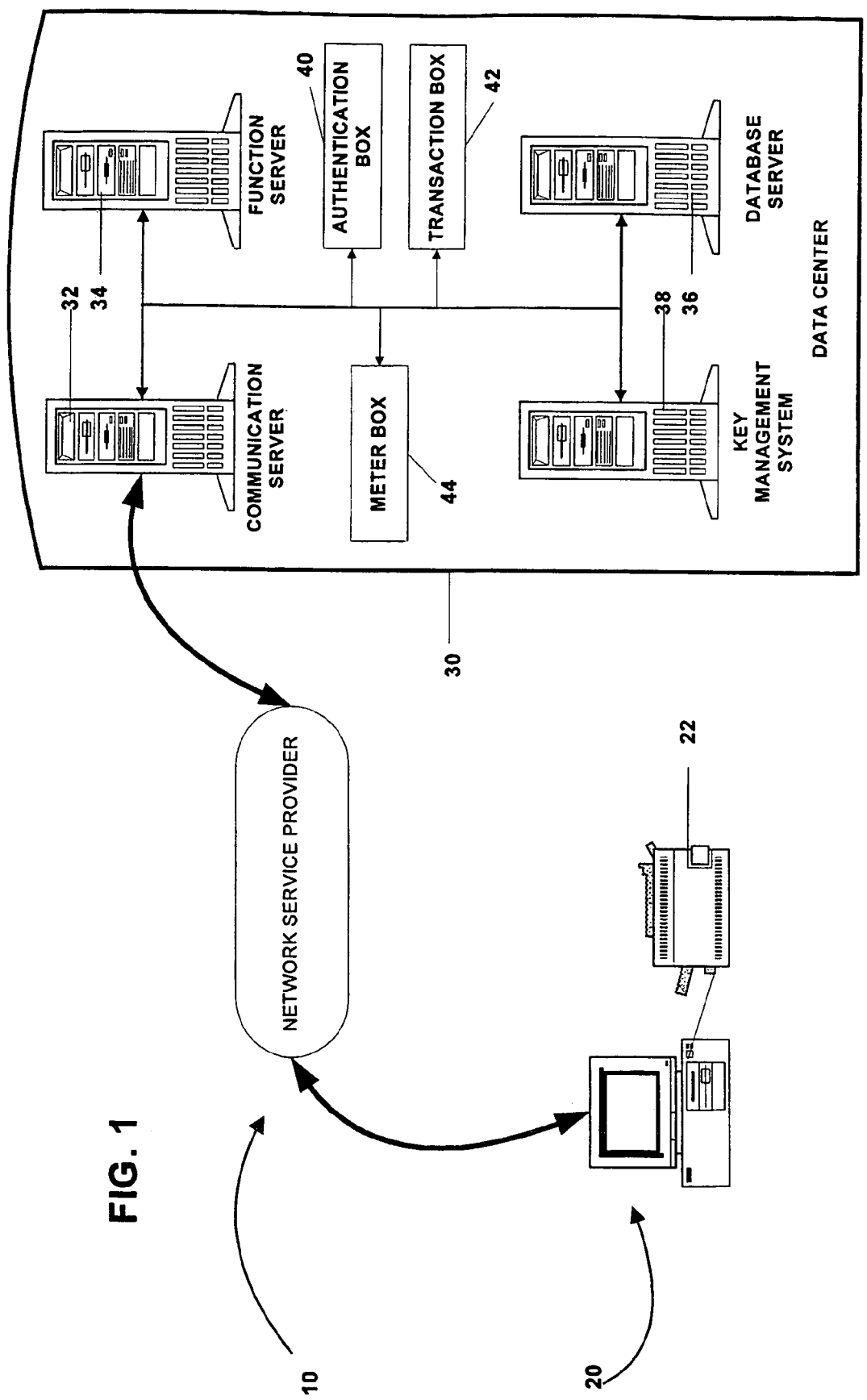
FIG. 1 is a block diagram of a virtual postage metering system for dispensing postage embodying the principles of the present invention.

In describing the present invention, reference is made to the drawings, wherein there is seen in FIG. 1, a virtual postage metering system, generally designated 10. Virtual postage metering system 10 prints open system indicia for securely evidencing postage. Virtual postage metering system 10 includes a plurality (only one is shown) of personal computer (PC) systems, generally designated 20, each having access to a printer 22 for printing evidence of postage on an envelope or label. PC 20 is connected with a transaction processing Data Center 30 that performs postal accounting and evidencing of postage. The virtual postage metering system 10 allows each mailer to use a conventional PC to remotely obtain evidence of postage payment on an as needed basis. Unlike conventional postage metering systems, virtual postage metering system 10 does not include any meter hardware located at the mailer's site. Nor are any postal funds stored at the mailer's site. All metering and accounting of funds occur at Data Center 30 using functional software and database records representing each mailer's "postage meter", referred to herein as a "meter account".

The accounting method for virtual postage metering system 10 may be a conventional prepayment or post-payment system. The preferred method a prepayment method wherein each mailer is required to put a minimum amount of money into the mailer's virtual postage metering system 10 account. As account funds drop below a specific level a refill is charged against the mailer's account. An alternate accounting method that is suitable for a virtual postage metering system is a real-time payment method in which the amount of a transaction is charged to a mailer's credit card account when the transaction occurs. This method is referred to herein as a "trickle charge" postage payment, because the mailer does not pay for postage for a mailpiece until the mailer is ready to print the mailpiece.

In the virtual postage metering system, a "meter" vendor, such as Pitney Bowes Inc., provides the mailer with client software that runs on PC 20, e.g., the client software may be downloaded from the vendor's Internet server. Alternatively, the client software may be the Internet browser based home pages that provide user interactions with the Data Center 30. The meter vendor also manages Data Center 30. The client software initiates communications with Data Center 30 which performs metering transactions to evidence postage for single mailpieces or batches of mailpieces. In the preferred embodiment, the client software establishes a connection to the Data Center, and requests postage by providing postal information relating to the requested transactions, such as postage amount, addressee information and (optionally) the origin of deposit for each mailpiece. Data Center 30 receives the postal information, determines the origin zip for the mailpiece(s), performs accounting functions and generates an encrypted evidence of postage payment, such as a token or digital signature, and sends indicium information including the token, to PC 20. PC 20 receives the indicium information, creates an indicium bitmap, which can be displayed on a PC monitor (not shown) and printed on the mailpiece by printer 22. PC 20 then disconnects from Data Center 30 or requests another transaction. The connection between PC 20 and Data Center 30 may be through a Network Service Provider, such as on the Internet, or by direct dial using the PC's modem.

Virtual postage metering system 10 eliminates the need to maintain and account for traditional metering devices at each mailer's site and provides flexibility for handling requests from multiple origins of deposit by each mailer. Virtual postage metering system 10 also provides value added services that are not available with conventional meter devices, such as, real-time address hygiene, direct marketing services and trickle charge postage payment. Virtual postage metering system 10 provides user authentication by Data Center 30 to identify mailers with valid accounts. When a mailer has been authenticated for each request, for example, by a username, password or other conventional methods, Data Center 30 services the request, and returns indicium information to the PC 20 where the indicium is created and printed on the mailpiece.

Referring again to FIG. 1, the mailer initiates a postage evidencing transaction by running client software in PC 20, which contacts Data Center 30. At Data Center 30, a Communication Server 32 supports connectivity from various communication technologies and protocols. The Communication Server merges all incoming traffic and routes it to a Function Server 34, which includes application software that supports mailer sign-on, postage dispensing and postal reporting. All mailer and meter information is accessed from a Database Server 36 where the information is securely stored using secure cryptographic processes and protocols as described below. Data Center 30 maintains cryptographic keys for each meter account in Database Server 36. The cryptographic keys are used for postage evidencing and verification as well as for security of the records stored in Database Server 36. A Key Management System 38 administers all cryptographic keys used in virtual postage metering system 10. The cryptographic keys may be distributed to verifiers in remote locations. U.S. Pat. No. 5,812,666, assigned to the assignee of the present invention, describes such a key management system.

A mailer may establish a meter account through an on-line sign-up process with Data Center 30. During sign-up, the mailer enters, at PC 20, account information, such as user name, password and method of payment. Any registration fees can be charged at this time. Data Center 30, preferably administered by a meter vendor, such as Pitney Bowes Inc., arranges all meter licenses and agreements between its mailers and the Post.

In the present invention, the PSD does not exist, i.e., there is no metering device coupled to the PC from which postage payment is requested. Virtual postage metering system 10 replaces the accounting and metering functions of the PSD with metering software at PC 20 and mailer account information performed and updated at Data Center 30. The virtual postage metering system 10 provides each mailer with a metering system that has the capability of originating transactions from multiple origins of deposit. See, for example, previously noted U.S. patent application Ser. No. 09/242,206.

Various methods can be used to determine the origin of deposit for a requested transaction. For example, a method for determining origin zip code using a caller ID from a telephone call is disclosed in U.S. Pat. No. 5,943,658, assigned to the assignee of the present invention, which is hereby incorporated in its entirety by reference.

In accordance with the present invention, one or more cryptographic modules, referred to herein as secure "boxes", are located within Data Center 30 and are used to perform cryptographic processes. Each secure box is a secure, tamper-evident and tamper-responding device, including a processor and memory, that stores encryption keys and performs cryptographic operations using the keys within the secure boundary of the device. Data Center 30 includes several types of secure boxes, which are described below. In the preferred embodiment, Data Center 30 includes multiple boxes of each type for redundancy and performance.

Key Management System 38 includes a manufacturing box (not shown) that provides top-level keys used to generate random numbers for seeding each of the other secure boxes. By sharing a common cryptographic key, the secure boxes communicate securely within Data Center 30. Key Management System 38 also includes a "steel" box (not shown) that shares a common key with meter box 44 (described below) to encrypt/decrypt master token keys for postage evidencing transactions for each meter account. The steel box merges a vendor key and a postal key into one record in cipher text. For each meter account, Data Center 30 creates a logical meter, i.e. a meter record, in Database Server 36 by generating a token key using the vendor and postal keys, initializing meter registers (ascending and descending), meter freshness data (described below) and other postal information as part of the meter record, and then storing the meter record in Database Server 36.

Data Center 30 also includes a meter box 44 that shares a secret key with the steel box for decrypting the token key encrypted in the meter record. Meter box 44 also holds the key used for digital signature of transaction records, which are stored in Database Server 36. The only other information stored in meter box 44 is freshness data for each meter record processed by meter box 44. For each postage transaction, meter box 44 generates at least one digital token or signs the postage transaction, and updates the meter record corresponding to the transaction. Each meter record in Database Server 36 includes postal funds as well as the token keys in cipher text. Meter box 44 uses the token keys to generate tokens, updates the postal funds in the meter record, and signs the updated meter record. In this manner, meter box 44 performs and controls the secure accounting for each transaction. Meter box 44 can also be used to verify the token or the transaction signature for verification of the postage evidencing for the transaction.

Data Center 30 also includes an authentication box 40 that shares a different secret key with the steel box to decrypt an user-authentication key stored in cipher text in Database Server 36. Authentication box 40 also executes the authentication algorithms using the decrypted authentication key to authenticate a mailer. This function may be added to the steel box of key management system 38 to eliminate the need for a separate box at Data Center 30.

Finally, Data Center 30 includes an transaction box 42 that shares another secret key with the steel box to sign user transaction records other than the meter records signed by meter box 44, such as logins and login history records. Transaction box 42 later verifies the transaction record signature when the next transaction is requested.

Figure 2:
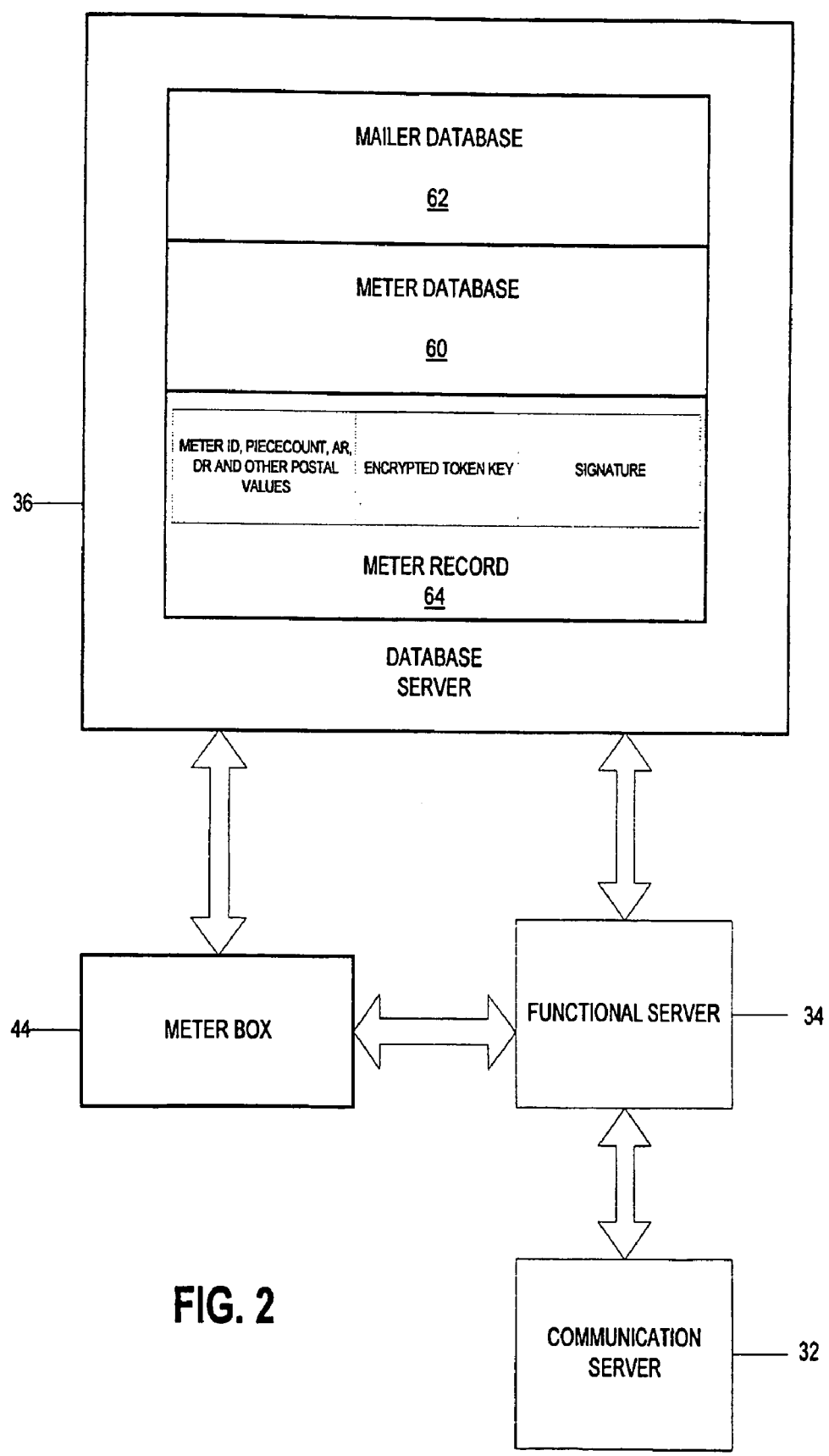
FIG. 2 is a bock diagram of the Data Center database server and secure box for the virtual postage metering system of FIG. 1.

Referring now to FIG. 2, a configuration of Database Server 36, including a meter database 60, a mailer database 62 and a database of meter records 64, is shown. Meter database 60 comprises meter information associated for each meter account, such as, meter serial number, record update counter, ascending register, descending register and other postal values. Meter Database 60 also includes storage of transaction records signed by meter box 44. The transaction records comprise, for example, origin postal code, transaction date/time, indicium date, delivery postal code, token(s), postage amount, and the digital signature. Mailer database 62 comprises mailer information and information that associates a mailer with a meter account.

In operation, Communication Server 32 receives a request for a meter transaction from mailer PC 20. The application software in the Function Server 34 controls the processing of the transaction request. Function Server 34 accesses mailer database 62 and meter database 60 to obtain records, including the appropriate meter record 64, corresponding to the meter account of the mailer initiating the request. Function Server 34 communicates mailer records from mailer database 62 to authentication box 40, which then authenticates the mailer requesting the transaction. Once the mailer has been authenticated, Function Server 34 communicates the appropriate meter record 64 to meter box 44, which verifies a signature and freshness data for the record. Meter box 44 decrypts the encrypted key(s) that are stored within meter record 64, performs accounting functions on the ascending and descending registers in meter record 64, and uses the key(s) to generate a token for the requested transaction. Meter box 44 then generates data for an indicium, and resigns meter record 64. The updated and signed record is then sent back to Database Server 36 where it is stored as part of meter database 60.

At Data Center 30, the authentication keys are not available in plain text, but must be distributed to the mailer. Conventional methods of distributing and updating the authentication key for each mailer can be used. See, for example, previously noted U.S. Pat. No. 5,812,666, which describes a key management system for distributing and updating cryptographic keys to the secure boxes and the mailer's PC.

One of the important tasks for key management system 38 is to obtain the postal key and associate it with a vendor key. In key management system 38, the steel box creates a meter serial number, manufacturing number, vendor and postal keys in one meter record 64 for each meter account.

For the encryption/decryption algorithms, a set of triple DES keys are used for encrypting the encryption keys for generating a tokens or signatures for indicia. Another set of triple DES keys are used for signing meter records. Meter box 44 securely stores both sets of triple DES keys. In order avoid using only one key to encrypt the entire set of meter keys for generating a tokens or signatures for indicia, a derived key is used. The first set of triple DES keys derives triple DES keys by encrypting the meter (account) serial number in each meter record. The derived triple DES keys then encrypt the encryption keys for the indicia which are to be stored in the Database Server 36. The second set of triple DES keys for signing uses a similar scheme to derive the signature keys in a similar manner, i.e. using the meter serial number as data to derive keys. It will be understood that one set of triple DES keys can be used for both purposes. However, it is desirable that each set of keys be used only for one purpose.

In the preferred embodiment of the present invention, one common key is used to sign all transactions and records that require a digital signature, such as, meter records, postage transactions, funds transfer records, master account records, etc. Multiple boxes of each box are used for redundancy and to share the workload as the number of transactions grow. The signing box, such as meter box 44 or authentication box 40, will also verify the signature of a record.

With regard to the signature algorithm for meter record 64, a message authentication code (MAC) is employed to provide message integrity for the sensitive virtual postage metering system 10 records. This MAC involves multiple applications of the Data Encryption Standard (DES). The signature keys will be updated using the current month and year. During manufacturing, two initial master keys will be entered into the non-volatile memory (NVM) of meter box 44. NVM is used both for permanent storage and for the prevention of external access to the key information. The keys for indicia and the keys for signature are derived in a conventional manner, such as described above. The virtual postage metering system 10 record signature verification algorithm simply recalculates the signature of the meter record 64 using the signature algorithm and data within meter record 64 and compares calculated signature to the signature in meter record 64.

Figure 3:
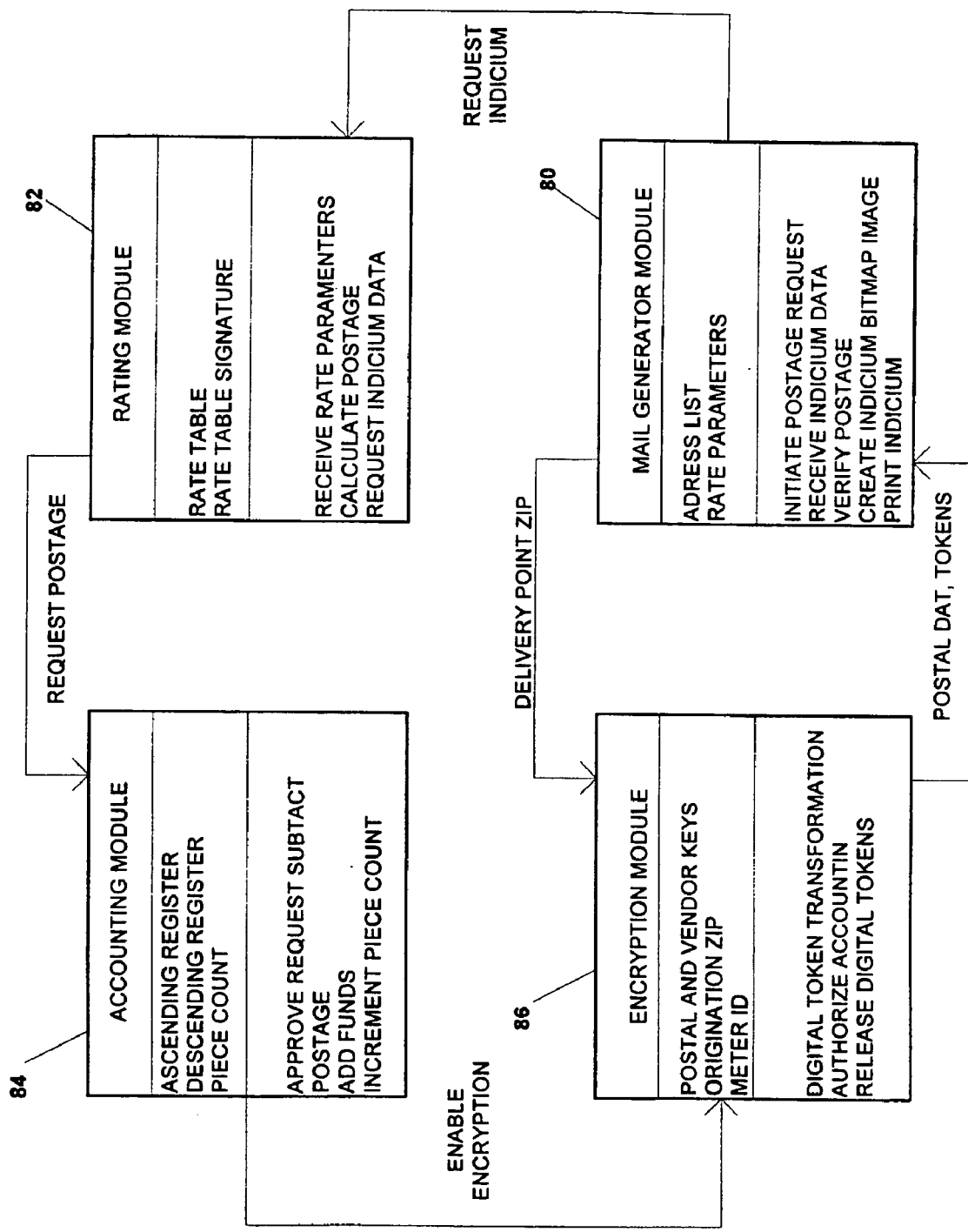
FIG. 3 is a process flow for postage authorization and printing by a postage metering system.

Referring now to FIG. 3, a typical process flow for postage authorization and printing is shown. The process includes operations occurring in four modules in a postage metering system: a mail generator module 80, a rating module 82, an accounting module 84 and an encryption module 86. The mail generator module 80 includes a list of addresses and a list of postal rate parameters. The rating module 82 includes the current rate table and a rate table signature which authenticates the current rate table. The accounting module 84 includes an ascending register (AR), a descending register (DR) and a piece count. The encryption module 86 includes cryptographic keys, origin ZIP information and an identification of the postage metering system (meter ID).

In virtual postage metering system 10, mail generator module 80 resides in PC 20 and the rating, accounting and encryption modules reside at Data Center 30. The encryption module 86 resides in meter box 44, and the accounting module 84 resides in part in meter box 44 (AR, DR and piece count) and in Database Server 36 (accounting functions). The rating module 82 preferably resides in Database Server 36, however, the rating module may reside in PC 20. In a PC metering system, the accounting and encryption modules would reside in the PSD and the mail generator and rating modules would reside in the Host PC.

The following process is described for a postage evidencing transaction for a single mailpiece. It will be understood that the process may also be used is for postage evidencing transactions for a batch of mailpieces.

The process begins with mail generator module 80 initiating a request for postage. Prior to this request for postage, a user has selected (for each mailpiece) a mailing address from the address list and entered or defaulted to various rate parameters for a mailpiece. The rating module 82 receives the request with the rate parameters, calculates postage amount and requests postage evidencing. It is noted that the user may enter a postage amount, which could be one of the rate parameters in which case, the rating module would defer to the entered postage amount. The accounting module 84 approves the request for postage evidencing, subtracts the postage amount from the descending register, adds the postage amount to the ascending register and increments the piece count. Once the accounting has been completed, the encryption process is enabled. The encryption module 86 performs the encryption function using the postal and vendor keys, origin ZIP received from mail generator module), meter ID, AR and DR and piece count (collectively referred to as postal data). The encryption function, which is a cryptographic transformation computation that utilizes, for example, a secret key to produce digital tokens/signatures, provides one or more digital tokens or digital signatures of the previously noted postal data. The postal data and digital tokens/signatures are collectively referred to herein as indicium data. The mail generator receives the indicium data, optionally verifies that sufficient postage has been paid and prints the indicium.

Figure 4:
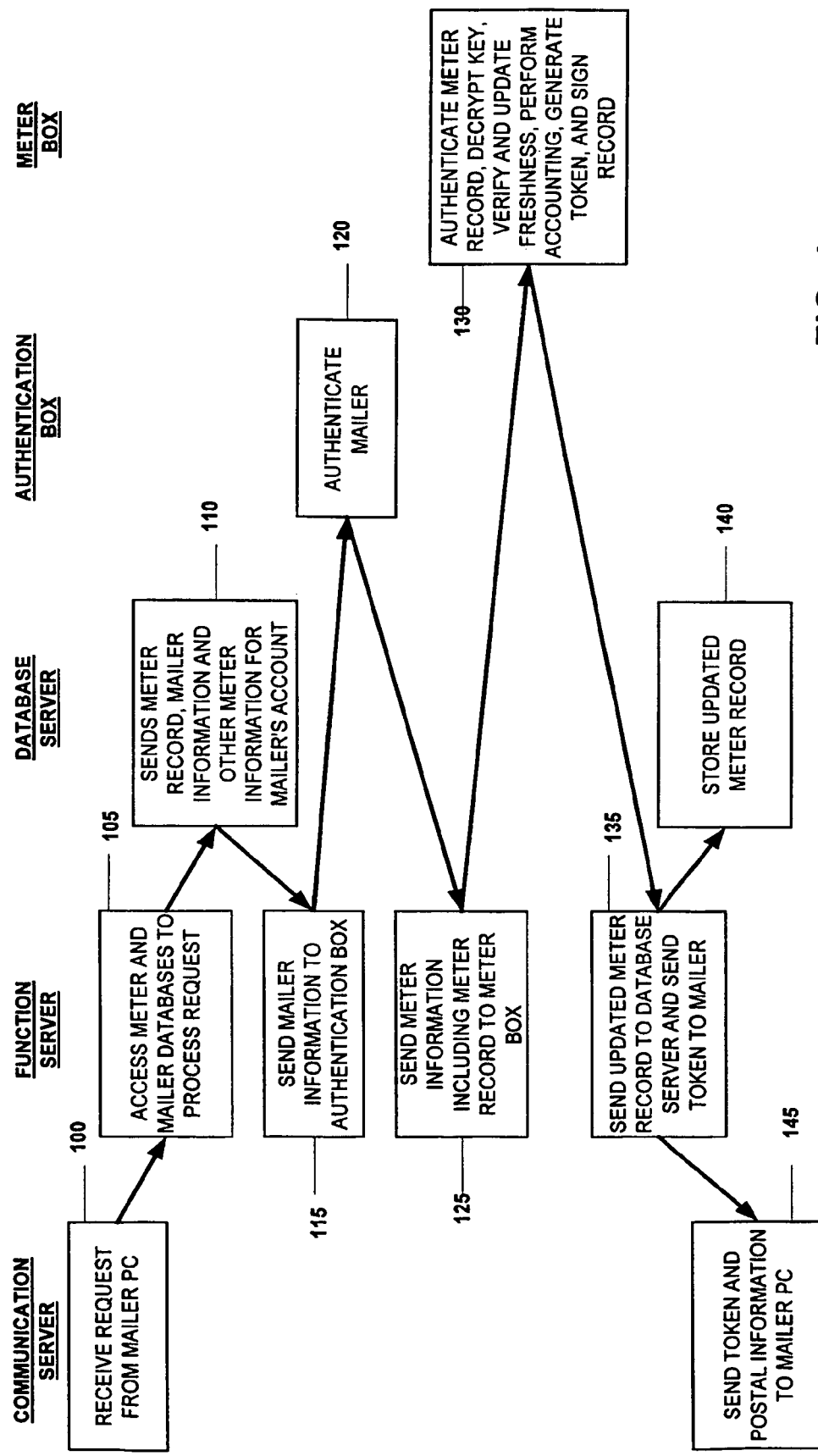
FIG. 4 is a flow chart of the process for evidencing postage by the virtual postage metering system of FIG. 1.

Referring now to FIG. 4, the process for securely performing a postage evidencing transaction in a virtual postage metering system is described. At step 100, Communication Server 32 receives a request for postage evidencing from mailer PC 20. At step 105, Function Server 34 requests access to the mailers account information stored in Database Server 36. At step 110, Database Server 36 sends mailer information, meter information, including a meter record associated with the mailer initiating the request. At step 115, Function Server 34 sends the mailer information to Authentication Box 40. When the mailer is authenticated at step 120, then, at step 125, Function Server 34 sends the meter information, including the meter record to meter box 44. At step 130, meter box 44 authenticates the meter record, decrypts the encrypted token key which is part of the record, verifies freshness of the record, performs accounting, generates a token, updates the freshness data and signs the meter record, which is returned to Function Server 34. At step 135, Function Server 34 sends the updated and signed meter record to Database Server 36 and sends to the Communication Server 32 the token and associated postal information needed to create an indicium. At step 140, Database Server 36 stores the updated and signed meter record. At step 145, Communication Server 32 sends the token and postal information to mailer PC 20.

Figure 5:
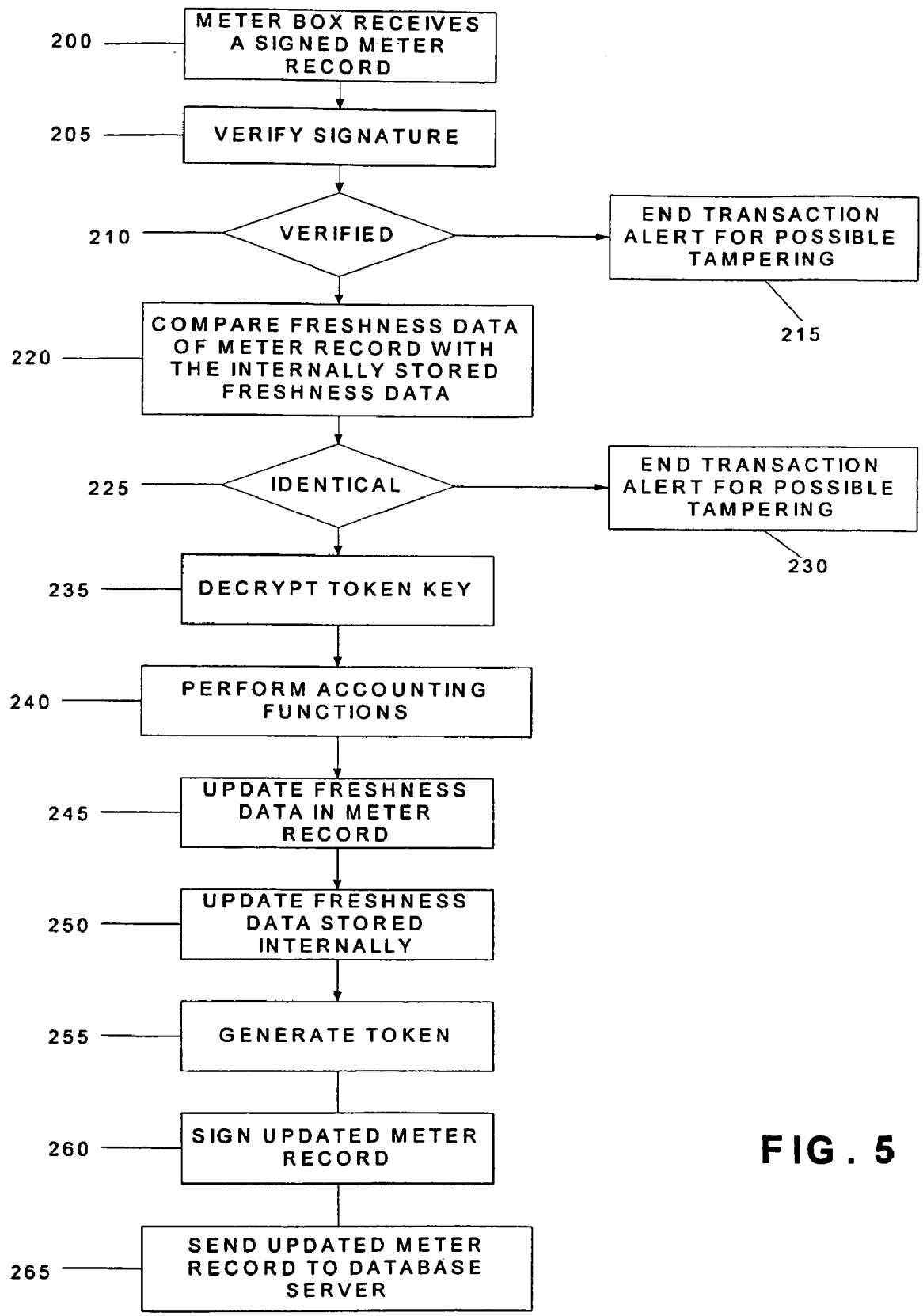
FIG. 5 is a flow chart of the process performed within the secure meter box of the virtual postage metering system of FIG. 1.

Referring now to FIG. 5, the process performed within the secure meter box of the virtual postage metering system is described. At step 200, meter box 44 receives a signed meter record. At step 205, the signature of the meter record is verified. If not verified at step 210, then, at step 215, the meter box ends the transaction and alerts the Function Server 34 for possible tampering. If the signature has been verified, then, at step 220, the meter box compares freshness data that is stored in meter box for each meter account to freshness data stored as part of the meter record. The freshness data chosen for this comparison must be data that is unique for each transaction. In the preferred embodiment, the record update counter is used, however a random number, time stamp or other nonce may be used. The comparison at step 220 prevents inadvertent or intentional substitution of an old meter record for the current meter record during the virtual postage metering transaction.

At step 225, if the compared freshness data are not identical, then, at step 230, the meter box ends the transaction and alerts the Function Server 34 for possible tampering. If the freshness data stored in the meter record is identical to the freshness data associated with the meter record which is stored in the meter box, then, at step 235, the meter box decrypts the token key that was received in encrypted form as part of the meter record. At step 240, the meter box performs accounting functions for the transaction, such as incrementing the ascending register, decrementing the descending register and incrementing the record update counter. At step 245, the freshness data in the meter record is updated. At step 250, the freshness data stored in meter box 44 is updated. At step 255, the meter box generates the token using the decrypted token key. At step 260, the meter box updates the meter record by storing the new register values and record update counter in the meter record, and then signs the updated record using a key stored in the meter box. At step 265, the meter box sends the updated and signed meter record to Database Server 36 for storage until the next transaction for the meter account assigned to the meter record.

Figure 6:
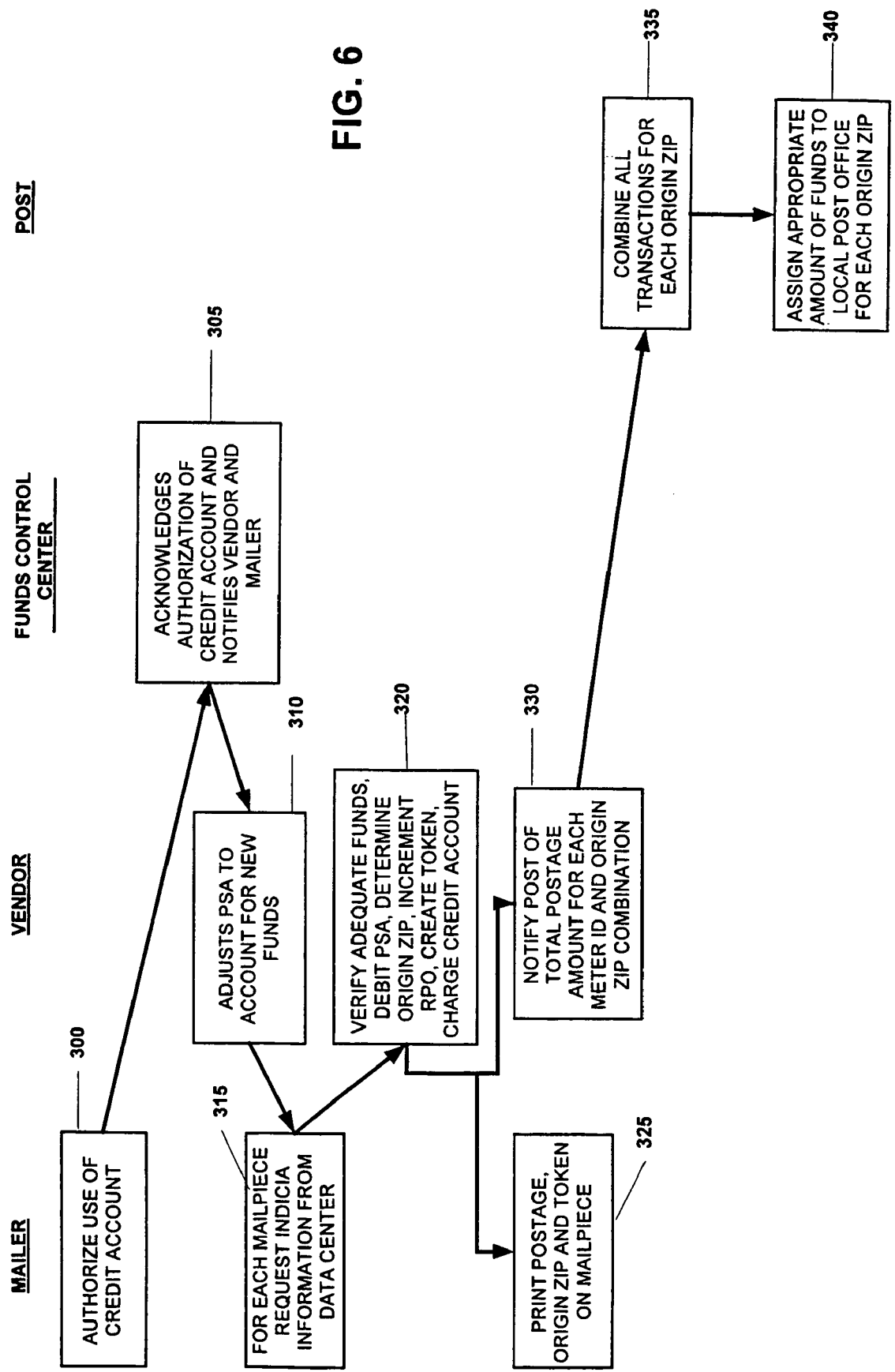
FIG. 6 is a flow chart of the process for trickle charge method for accounting and distributing funds to multiple origins of deposit in accordance with the present invention.

Referring now to FIG. 6, the process for distributing funds in accordance with a trickle charge method of payment begins at step 300, with the mailer, through PC 20, authorizing use of a credit card account to a funds control center, such as a bank. (Such authorization may occur through the Data Center to the funds control center.) At step 305, the funds control center acknowledges such authorization and notifies Data Center 30. At step 310, the Data Center activates the mailer's PSA by assigning the mailer's credit card account to it and notifies the mailer. At step 315, the mailer, through PC 20, initiates a request for indicium information from the Data Center 30, providing postal information, such as, postage amount and destination information. At step 320, Data Center 30 responds to the request by verifying sufficient funds are available, charging the mailer's credit card account, determining valid origin zip for the request, calculating a digital token or digital signature corresponding to the postal information provided with the request, and forwarding the indicium information including the digital token to PC 20. Data Center 30 also stores information relating to each transaction as a historical record to be forwarded to the Postal Service at a predetermined interval. At step 325, PC 20 obtains the indicium information from Data Center 30, generates an indicium bitmap and prints the indicium on the mailpiece. At some predetermined interval, for example daily, at step 330, Data Center 30 notifies the Postal Service of the total postage amount for each meter ID (PSA) and origin zip combination by forwarding the historical record to the Postal Service. At step 335, the Postal Service combines the transactions for each origin zip to determine the amount owed to each origin zip (local) post office. At step 340, the Postal. Service assigns an appropriate amount of funds from the funds control center to each local post office. Alternatively, steps 335 and 340 could be performed at the Data Center or funds control center.)

Referring now to FIG. 7, the process for distributing funds in accordance with a prepayment version of the present invention begins at step 400, with the mailer, through PC 20, sending funds to a funds control center, such as a bank. At step 405, the funds control center acknowledges such authorization and notifies Data Center 30. At step 410, the Data Center adjusts the PSA for the mailer to account for the additional funds and notifies the mailer. At step 415, the mailer, through PC 20, initiates a request for indicium information from the Data Center 30, providing postal information, such as, postage amount and destination information. At step 420, Data Center 30 responds to the request by verifying sufficient funds are available, debiting the mailer's account, determining valid origin zip for the request, calculating a digital token or digital signature corresponding to the postal information provided with the request, and forwarding the indicium information including the digital token to PC 20. Data Center 30 also stores information relating to each transaction as a historical record to be forwarded to the Postal Service at a predetermined interval. At step 425, PC 20 obtains the indicium information from Data Center 30, generates an indicium bitmap and prints the indicium on the mailpiece. At some predetermined interval, for example daily, at step 430, Data Center 30 notifies the Postal Service of the total postage amount for each meter ID (PSA) and origin zip combination by forwarding the historical record to the Postal Service. At step 435, the Postal Service combines the transactions for each origin zip to determine the amount owed to each origin zip (local) post office. At step 440, the Postal Service assigns an appropriate amount of funds from the funds control center to each local post office.

Function Server 34 performs the following process for user sign-up. Function Server 34 validates received sign-up information received from PC 20. Accessing Database Server 36, Function Server 34 obtains the next available master account ID number and the next available customer ID number from the database. Function Server 34 then creates a new master account record and, in conjunction with Key Management System Server 38, generates keys for the new meter account. Function Server 34 server transfers funds from the newly created master account to the new meter account. Function Server 34 creates a new meter record 64 which is stored in meter database 60 in Database Server 36 and a new mailer record which is stored in mailer database 62 in Database Server 36.

During sign up of new mailers, the mailer's address information is entered at PC 20. The Virtual postage metering system 10 client software running in PC 20 selects the zip code from the address information entered by a user. The zip code is checked to be a valid zip code and is assigned as the origin of deposit for the user's account. The signup request is transmitted to the Data Center 30. Function Server 34 receives the request for a new mailer account and processes the request as set forth above to establish a new meter record 64. The meter record 64 is then associated with the origin of deposit from the signup request, which becomes the default origin of deposit for meter record 64.

Function Server 34 performs the following process when a request for a postage transaction is received from PC 20. Function Server 34 checks the validity of the postal data, such as date of mailing, amount of postage, origin postal code and destination address, that is received with the request. If not valid, Function Server 34 exits the process. If valid, Function Server 34 communicates with Database Server 36 to retrieve the meter record 64 corresponding to the user initiating the request. Function Server 34 verifies sufficient funds are available in the user's account for the requested transaction. If sufficient funds are available, Function Server 34 sends the meter record and the postal data to meter box 44 which performs the process set forth above. When meter box completes the accounting process, Function Server 34 constructs the postage transaction record reflecting the completed transaction, signs it and sends it to Database Server 36 for storage. Function Server 34 also sends the updated meter record 64 that is receives from meter box 44 to Database Server 36 for storage.

Database Server 36 includes records of mail volumes and accounting of postal funds within it database. By access Data Center 30, the postal service can perform on-line tracking of selected information available from Data Center 30. Such information includes volumes of mail pieces processed or in process, allocation of funds to originating post offices and meter account use. Such on-line tracking allows the postal service to manage it resources in a more efficient manner. For example, the postal service could identify locations with peak workloads and could determine locations of mail fraud by comparing mail volumes with expected postal revenues.

Fundamental to virtual postage metering system 10 is the information that is available within the files and records stored in Database Server 36. As described above, Data Center 30 provides typical metering related administrative services, such as evidencing postage, creating user accounts, authenticating users, registering new meter accounts, activating and deactivating meter accounts, managing postage funds, and logging transactions and meter usage. Data Center 30 provides reports on postage transactions and meter usage to the user, to the administrator, such as Pitney Bowes Inc., and to the postal service. The reports can be organized by user account (and user's departmental accounts), indicia serial number, and/or origination zip, as requested.

Data Center 30 has the capability of handling simultaneous execution of multiple transaction types, such as on-line and deferred transaction execution. Data Center 30 provides reception, queuing and execution of multiple requests/services concurrently.

Data Center 30 "manufactures" meters, i.e. metering accounts, registers meters, licenses meters, activates valid meters, and deactivates invalid meters from normal operation (i.e. out of service meters). The manufacturing of a meter entails associating the manufacturing number with the meter keys (such as postal key and the vendor key). The keys are securely installed and verified. Function Server 34 interfaces with the Key Management System Server 38 for installing keys, verifying keys, and registering meters. Meters are activated by assigning one or more users the privilege of using the metering account. The meter is associated with a meter record that includes an indicia serial number, manufacturing number, postal key, vendor key and piece count.

The meter (i.e. indicia serial number) is associated with an origin postal code (e.g., origination zip code) to accommodate postal deposit restrictions and accounting of postal funds. Data Center 30 registers meters for the postal service by associating an indicia serial number with an origination zip code, and filing the appropriate postal forms. If the meter has an origin postal code of "00000", the user shall be able to select the origin of deposit. A floating origin of deposit, "00000", allows customers to use their on-line meters from a variety of locations.

Data Center 30 creates, deletes, modifies and authenticates users. Data Center 30 sets up and modifies access rights for the users to request transactions, purchase postage, and receive administrative services. Meters may be deactivated from normal operation temporarily or permanently, due to insufficient funds, inspection, credit abuses or meter abuses.

Value-Added Services

Virtual postage metering system 10 provides value-added services for the user and the postal service. Data Center 30 allows the user access to user account information, on-line rates, special mail services, address cleansing and postal coding services. Data Center 30 shall allows the Post access to postal revenue accounting (postage used by origin postal codes) and to transfer files containing address changes. The user may request accounting services by master account, department, meter and user.

Data Center 30 provides the ability to cleanse an address (i.e. make corrections to invalid addresses) and attach postal coding. See, for example, U.S. Pat. No. 5,454,038. Data Center 30 provides domestic and international postal rates. PC 20 can be integrated with a scale for input into the postal rating process. Data Center 30 provides on-line services such as certified mail and special receipts. Data Center 30 provides on-line tracking of postal funds and mail volumes to authorized postal employees.

Data Center 30 provides a change of address service to the users. The data center shall provide mechanism to accept a list of addresses from the post and manage the list. Addresses accepted from the user are checked against the list from the post to determine if any of the addresses have changed. The data center shall notify the user of addresses that have changed.

Virtual postage metering system 10 includes load balancing capability which Data Center 30 to process requests from all remote users in a timely and efficient manner. Load balancing as applied to Virtual postage metering system 10 ensures that each new request for service is directed to the least used resource in a system where there are multiple resources providing the same service. This applies to VM resources like Communication Server 32, Functional Server 34, Database Server 36, Key Management System Server 38 and the secure boxes in Data Center 30.

Virtual postage metering system 10 includes communication architecture that understands where the application services are located and the number of users connected to each server. This information allows the communication architecture to control the following features, Dynamic load balancing, redundancy and geographic distribution of the virtual meter server.

Dynamic load balancing is a method to allow multiple servers to connect to new users depending on how busy the server currently is. Redundancy is a method to allow multiple virtual meter servers to reside simultaneously on a network, such that, if a main server goes down for any reason, the backup server passes all information to the other corresponding on-line server(s). Geographic distribution is the ability to locate servers locally on a network over a Wide Area Network.

Virtual postage metering system 10 uses distributed processing for load balancing the servers at Data Center 30 to improve performance. The communications servers accept requests for service from each PC 20 accessing Data Center 30. Function servers are registered upon startup. The communications servers select a function server for processing the service request. The service request is added to the function server's wait queue. When the function servers reaches 80% utilization, another function server is spawned and registered with the active servers. The function servers check the wait queue for service requests and process these requests. Idle function or communication servers are unregistered and shutdown, removing them from the active servers list. Database servers are registered to accept database requests similarly to function servers. Multiple servers are running simultaneously to handle the workload.

It will be understood that although the embodiments of the present invention are described as postage metering systems, the present invention is applicable to any value metering system that includes transaction evidencing, such as monetary transactions, item transactions and information transactions. While the present invention has been disclosed and described with reference to a single embodiment thereof, it will be apparent, as noted above, that variations and modifications may be made therein. It is, thus, intended in the following claims to cover each variation and modification that falls within the true spirit and scope of the present invention.

Personal Post Office is a trademark of Pitney Bowes Inc.

What is claimed is:

1. A system for dispensing postage value comprising:
   a data center communicatively coupled to a remote computer via a network, a user initiating a request to the data center via the remote processor to dispense postage value to be printed by a printer coupled to the remote processor, the data center comprising:

a storage device to store data records, the data records including a user account and a meter account associated with the user;

a first cryptographic module coupled to the storage device, the first cryptographic module including a first key to decrypt a user authentication key included in the user account, the user authentication key being used to authenticate the user; and a second cryptographic module coupled to the storage device, the second cryptographic module including a second key to decrypt a token key included the meter account, the token key used to generate a digital token, the second cryptographic key further including a third key used to sign a transaction record associated with generating the digital token, the signed transaction record being stored in the storage device;

wherein the data center sends the digital token to the remote processor via the network.

2. The system according to claim 1, wherein the data center further comprises:

a third cryptographic module coupled to the storage device, the third cryptographic module including a fourth key used to sign a user transaction record, the user transaction record being stored in the storage device.

3. The system according to claim 2, wherein the first, second, third and fourth keys are identical.

4. The system according to claim 1, wherein the data center further comprises:

a key management system to manage the first, second and third keys.

5. The system according to claim 1, wherein the network is the Internet.

6. A method for performing a postage evidencing transaction comprising the steps of:

receiving at a data center a request for postage evidencing from a remote computer, the request including information related to a mailer;

providing a first record associated with the mailer stored in the data center to a first cryptographic module at the data center, the first cryptographic module using a first key to decrypt a user authentication key included in the first record, the user authentication key being used to authenticate the mailer;

providing a second record to a second cryptographic module at the data center, the second cryptographic module using a second key to decrypt a token key included in the second record, the second cryptographic module using the token key to generate a digital token, the second cryptographic module further generating a transaction record associated with generating the digital token;

using a third key to sign the transaction record;

storing the signed transaction record at the data center; and sending the digital token to the remote computer to be included as postage evidence on a mailpiece.

7. The method according to claim 6, further comprising:

generating a user transaction record each time a user accesses the data center;

signing the user transaction record with a fourth key; and storing the signed user transaction record at the data center.

8. The method according to claim 7, further comprising:

verifying the user transaction record when a next transaction is requested.

9. The method according to claim 6, further comprising:

providing value added services to the mailer, the value-added service including at least one of on-line rating, special mail services, address cleansing and postal coding services.

10. The method according to claim 6, further comprising:

providing on-line tracking of all postal transaction processed by the data center.

* * * * *